US007617327B1

(12) United States Patent
Allam et al.

(10) Patent No.: US 7,617,327 B1
(45) Date of Patent: Nov. 10, 2009

(54) METHOD AND SYSTEM FOR IMPLEMENTING EXTERNAL APPLICATIONS USING REMOTE SOCKET APPLICATION PROGRAMMING INTERFACE FOR VIRTUAL ROUTERS

(75) Inventors: Bhasker Allam, Fremont, CA (US); Shankar Agarwal, Fremont, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 849 days.

(21) Appl. No.: 10/775,732

(22) Filed: Feb. 9, 2004

Related U.S. Application Data

(60) Provisional application No. 60/455,706, filed on Mar. 17, 2003.

(51) Int. Cl.
 G06F 15/173 (2006.01)
 H04L 12/28 (2006.01)
 G06F 9/455 (2006.01)
(52) U.S. Cl. ............................ 709/238; 370/389; 718/1
(58) Field of Classification Search ......... 709/238–244, 709/249
 See application file for complete search history.

(56) References Cited

U.S. PATENT DOCUMENTS

| 6,907,039 | B2* | 6/2005 | Shen ........................... 370/400 |
| 7,039,720 | B2* | 5/2006 | Alfieri et al. ................ 709/242 |
| 7,242,665 | B2* | 7/2007 | Langille et al. ............. 370/217 |
| 2003/0051048 | A1* | 3/2003 | Watson et al. ............... 709/238 |

OTHER PUBLICATIONS

White paper by IP Infusion, "Virtual Routing for Provider Edge Applications", 2002.*

X. W. Huang, R. Sharma and S. Keshav, "The ENTRAPID Protocol Development Environment", Proceedings of IEEE Infocomm'99, Mar. 1999.*

Jain, P.G.; Hutchinson, N.C.; Chanson, S.T., "A Framework for the Non-Monolithic Implementation of Protocols in the x-Kernel", USENIX, Aug. 1994, High-Speed Networking Symposium, pp. 13-30.*

C. A. Thekkath, T. D. Nguyen, E. Moy, and E. D. Lazowska, "Implementing Network Protocols at User Level", IEEE/ACM Transactions on Networking, 1(5): 554-565, Nov. 1993.*

Jeffrey C. Mogul, Richard F. Rashid, and Michael J. Accetta. "The packet filter: An efficient mechanism for user-level network code". In Proceedings of the Eleventh ACM Symposium on Operating Systems Principles, pp. 39-51. ACM Press, Nov. 1987.*

(Continued)

*Primary Examiner*—William C Vaughn, Jr.
*Assistant Examiner*—Shirley X Zhang
(74) *Attorney, Agent, or Firm*—Townsend and Townsend and Crew

(57) ABSTRACT

A routing device including an operating system kernel, a virtual router residing external to the kernel, a router manager configured to manage the virtual router, an application residing external to the virtual router, and a number of physical interfaces is disclosed. The application selectively interacts with the virtual router and the kernel on a dynamic basis, which perform a number of tasks for the application. The virtual router includes a routing protocol stack configured to handle a number of routing protocols, a number of interface drivers configured to communicate with corresponding physical interfaces, an IP stack configured to interact with the routing protocol stack and perform a forwarding function via the interface drivers, the IP stack having a forwarding information table used to perform the forwarding function; and a socket layer having a corresponding socket API configured to facilitate interactions between the IP stack and one or more socket applications.

6 Claims, 2 Drawing Sheets

OTHER PUBLICATIONS

Chris Maeda and Brian N. Bershad. "Protocol service decomposition for high-performance networking", In Proceedings 14th SOSP, pp. 244-255, Asheville, NC, USA, Dec. 1993.*

M. Zec. "Implementing a Clonable Network Stack in the FreeBSD Kernel", In Proceedings of the USENIX 2003.*

D. Ely, S. Savage, and D. Wetherall, "Alpine: A User-Level infrastructure for network protocol development," in In Proceedings of the 3rd USENIX Symposium on Internet Technologies and Systems, 2001, pp. 171-184.*

Haut, "Advantages Of Shared Libraries", Sep. 1995.*

* cited by examiner

METHOD AND SYSTEM FOR IMPLEMENTING EXTERNAL APPLICATIONS USING REMOTE SOCKET APPLICATION PROGRAMMING INTERFACE FOR VIRTUAL ROUTERS

CROSS-REFERENCES TO RELATED APPLICATIONS

The present application claims the benefit of priority under 35 U.S.C. § 119 from U.S. Provisional Patent Application Ser. No. 60/455,706, entitled "METHOD FOR IMPLEMENTING EXTERNAL APPLICATIONS USING REMOTE SOCKET API FOR VIRTUAL ROUTERS" filed on Mar. 17, 2003, the disclosure of which is hereby incorporated by reference in its entirety for all purposes.

BACKGROUND OF THE INVENTION

The present invention generally relates to routers and, more specifically, to virtual routers in a split plane architecture.

A physical router typically includes a number of physical interfaces that are coupled respectively to corresponding packet sources. Packets received from the packet sources are received via the physical interfaces and forwarded by the physical router to their intended destinations.

A virtual router is generally defined as a collection of threads, either static or dynamic, in a routing device that provides routing and forwarding services similar to those offered by physical routers. A virtual router need not be a separate operating system process. The virtual router simply has to provide the perception or illusion that a dedicated router is available to satisfy the needs of the network(s) to which it is connected. A virtual router, like its physical counterpart, is an element in a routing domain which may include other routers that are either physical or virtual.

Virtual routers are used to implement Layer-3 virtual private networks (VPNs). A VPN is defined as one or more wide area network (WAN) links over a shared public network, typically over the Internet or an IP (Internet Protocol) backbone from a network service provider that simulates the behavior of dedicated WAN links over leased lines. Virtual routers support VPNs at Layer-3 of the Open Systems Interconnections (OSI) internetworking model. Network links that constitute network ports, VLANs (virtual local area networks) or virtual circuits are partitioned amongst the virtual routers. The virtual routers then perform routing on the individual links that are bound to them thus achieving network separation.

A router generally comprises a routing element and a forwarding element. To implement virtual routing, the routing and forwarding elements have to be distinctly separate. There are multiple ways of achieving this separation.

BRIEF SUMMARY OF THE INVENTION

A routing device is disclosed. The routing device includes an operating system kernel, a virtual router residing external to the operating system kernel, a router manager configured to manage the virtual router, an application residing external to the virtual router, and a number of physical interfaces.

The application is able to selectively interact with the virtual router and the operating system kernel on a dynamic basis in order to have the virtual router and the operating system kernel perform a number of tasks for the application.

The virtual router further includes a routing protocol stack configured to handle a number of routing protocols, a number of interface drivers configured to communicate with corresponding physical interfaces, an Internet Protocol (IP) stack configured to interact with the routing protocol stack and perform a forwarding function via the interface drivers, the IP stack having a forwarding information table, information from which is used to perform the forwarding function; and a socket layer having a corresponding socket application programming interface, the socket layer configured to facilitate interactions between the IP stack and one or more socket applications, such as, the routing protocol stack and other external applications. The remote socket application programming interface is used to facilitate communications with the socket layer. Furthermore, the socket application programming interface allows multiple applications to interact with the IP stack via the socket layer. The IP stack of the virtual router resides external to the operating system kernel.

The operating system kernel further includes an associated socket layer, the socket layer having a corresponding socket application programming interface. The application is able to communicate with the operating system kernel via the associated socket layer using the corresponding socket application programming interface to have the operating system kernel perform one or more tasks.

In one exemplary implementation, the routing device of the present invention is incorporated into an UNIX system and software is used to implement the virtual router and the router manager.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of one or more exemplary embodiments will now be described. According to an exemplary aspect, the method of the present invention achieves separation of elements in a router by having each virtual router with its own IP (Internet Protocol) stack, routing protocol stack and forwarding information table. This is achieved by implementing an IP stack that runs in the user space on multi-user and multi-process system, such as, a UNIX system. In a typical IP network element, the IP stack is always part of the kernel. By running the IP stack in the user domain, it is possible to build multiple virtual routers on a single multi-process system. The forwarding information table is implemented in hardware. The network links are on the line cards that are associated with individual virtual routers. The routing protocols are also part of the virtual router process and exchange routing information over the network links and update the routing table on the line cards.

According to one exemplary implementation, the TCP/IP stack runs in the user space. The user space TCP/IP stack provides the standard socket interface to the routing protocols for updating the routing table, which facilitates easy porting of the routing protocols. As will be further described below, the standard socket interface can also be used to allow an application that is external to the virtual router to communicate with the IP stack and have certain tasks performed via the virtual router.

In one implementation, the IP stack is not modified. Because the IP stack is not modified, it behaves exactly the same as any other IP stack. As a result, the porting of routing protocols or other applications that use sockets becomes easy. Moreover, by not changing the IP stack, there is no need to re-test the IP stack; otherwise, the IP stack would have to be tested, the testing of which is a long drawn and expensive process.

Having separate TCP/IP and routing protocol stacks for each virtual router requires a large amount of memory. To conserve memory, dynamic libraries of the TCP/IP and the routing protocol stacks are created. By using dynamic libraries, the UNIX operating system is directed to maintain a single copy of the stack libraries in the memory, thus reducing memory requirements.

Figure 1:
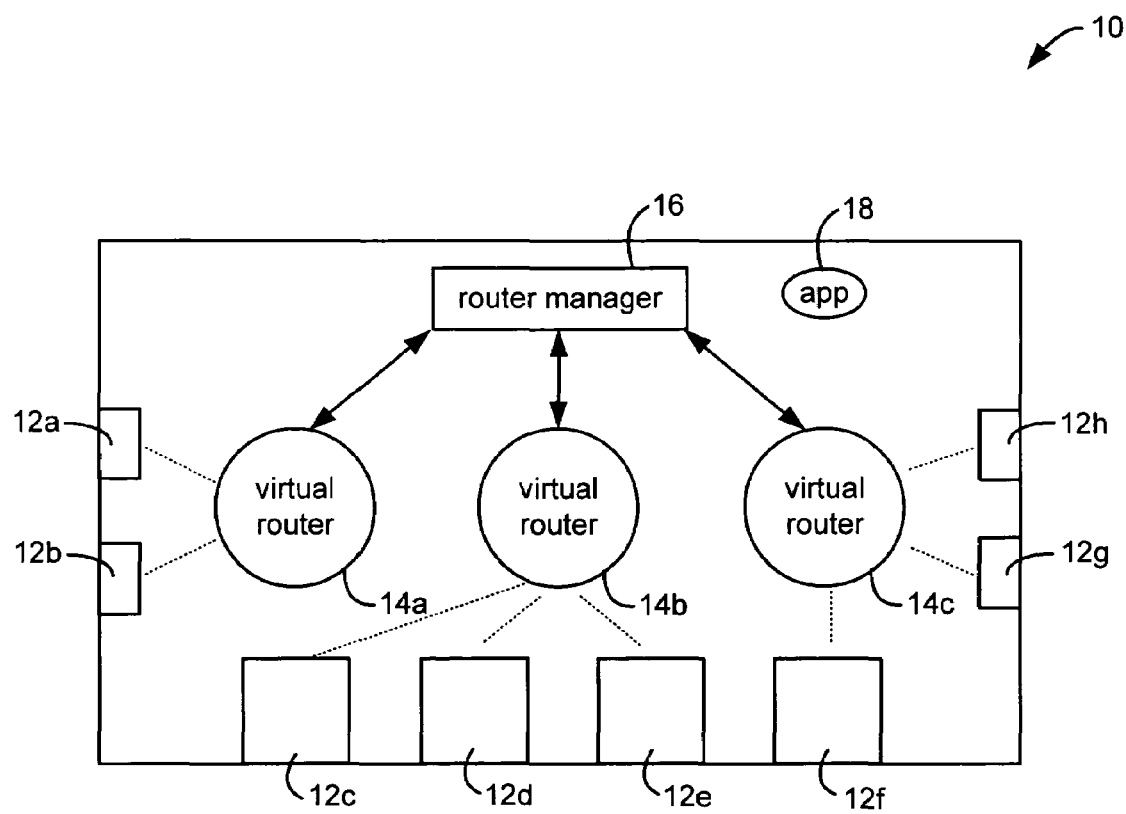
FIG. 1 is a simplified schematic diagram illustrating an exemplary embodiment of the present invention.

FIG. 1 is a simplified schematic diagram illustrating one embodiment of the present invention. As shown in FIG. 1, a routing device 10 includes a number of physical interfaces 12, a number of virtual routers 14 and a router manager 16. The physical interfaces 12 are designed to be coupled or bound to corresponding packet sources to receive packets to be forwarded. Each virtual router 14 is designed to be coupled to one or more of the physical interfaces 12. Different virtual routers 14 can be coupled to different physical interfaces 14. The router manager 16 controls the coupling of the virtual router 14 to its corresponding physical interfaces 12. The coupling is performed on a dynamic basis. In other words, a virtual router 14 can be coupled to different physical interfaces 12 at different times as managed by the router manager 16. In one implementation, upon startup of the routing device 10, none of the virtual routers 14 is bound to any physical interfaces 12. The router manager 16 handles the subsequent coupling of the virtual routers 14 to their corresponding physical interfaces 12. The operator of the routing device 10 is responsible for creating these bindings between the physical interfaces 12 and the virtual routers 14.

Furthermore, the routing device 10 includes at least one application 18. The application 18 can be a process that runs on the underlying operating system of the routing device 10. The application 18 is external to the virtual routers 14 and is able to selectively communicate with the virtual routers 14 so as to have tasks performed, as will be further described below. Optionally, the application 18 is also able to communicate with the underlying operating system of the routing device 10 to have tasks performed.

Figure 2:
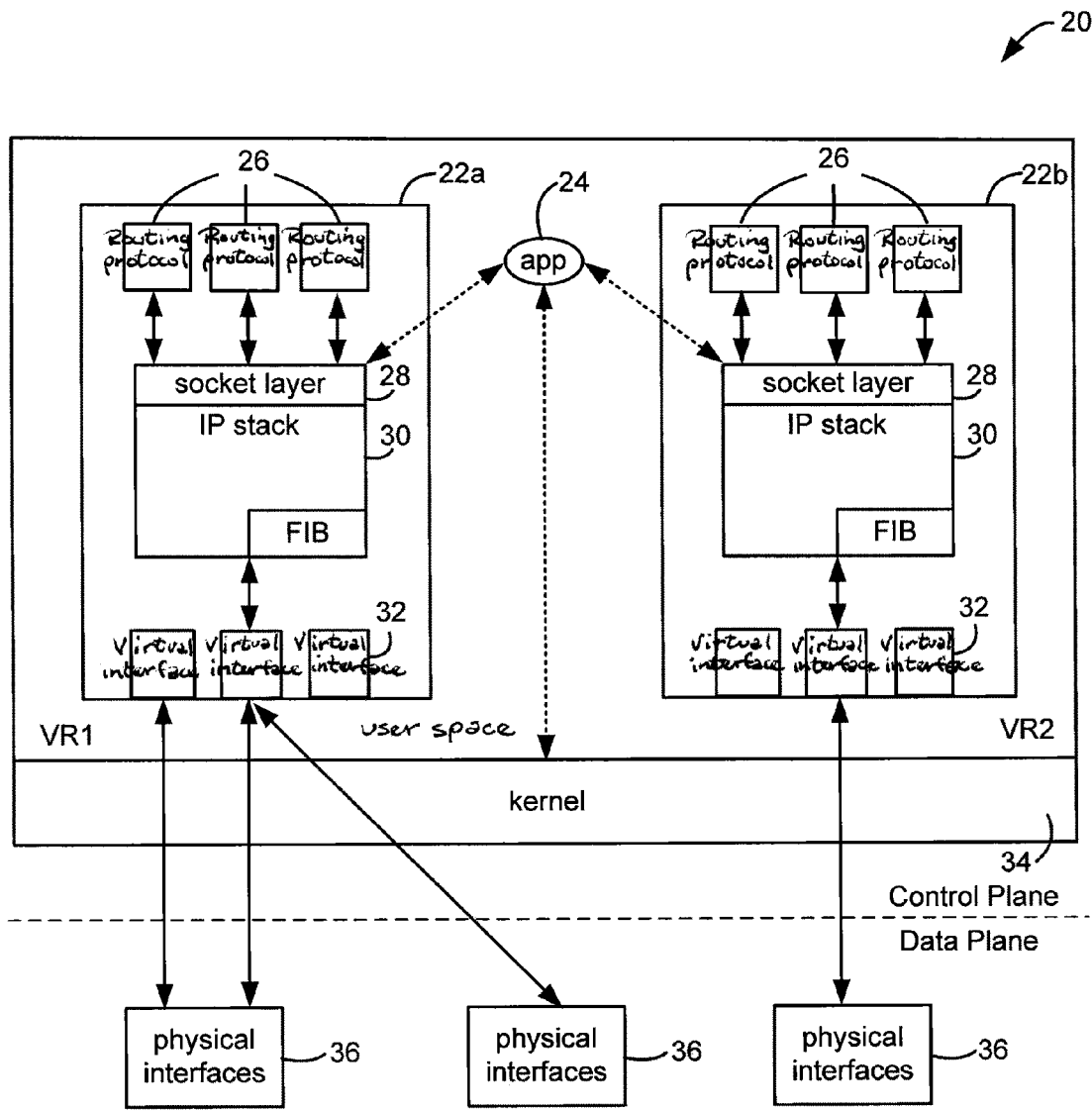
FIG. 2 is a simplified schematic diagram further illustrating an exemplary embodiment of the present invention.

FIG. 2 is a simplified schematic diagram further illustrating an embodiment of the routing device 20. As shown in FIG. 2, in this embodiment, the routing device 20 includes a number of virtual routers 22 and an operating system kernel 34. Each virtual router 22 includes a number of elements comprising a routing protocol stack, a socket layer 28, an IP stack 30 and a number of interface drivers 36. The routing protocol stack includes a number of entities 26 that are capable of respectively handling routing protocols supported by the virtual router 22 including, for example, RIP (Routing Information Protocol), OSPF (Open Shortest Path First), BGP (Border Gateway Protocol) and the like. Other routing protocols may be supported in the routing protocol stack depending on the requirements of the virtual router 22. Each entity 26 is associated with a particular routing protocol and contains an appropriate routing table.

As mentioned above, each virtual router 22 includes the socket layer 28. The socket layer 28 facilitates communications between the IP stack 30 and other elements, such as, the routing protocol stack and the application 24. Communications with the socket layer 28 are achieved using a socket application programming interface (API). In one exemplary implementation, the socket API follows the standard Berkeley socket API. Based on the disclosure and teachings provided herein, a person of ordinary skill in the art will know of other protocols or standards that can be used as the socket API in accordance with the present invention. The use of the socket layer 28 and its API will be further described below.

Each virtual router also includes the IP stack 30. The IP stack 30 contains a forwarding information base (FIB). Via the socket layer 28, the IP stack 30 interacts with the entities 26 and uses the FIB to facilitate forwarding of packets to their intended destinations; the IP stack 30 is also able to communicate with the application 24 to carry out one or more tasks for the application 24.

Virtual routers 22 may be configured in a similar or different manner depending on the routing design and/or requirements of the routing device 20. One virtual router 22a within the routing device 20 can be different from another virtual router 22b with respect to their constituent elements. For example, one virtual router 22a may have a routing protocol stack that supports one set of routing protocols, while the routing protocol stack of another virtual router 22b may support a different set of routing protocols; and one virtual router 22a may support one set of physical interfaces, while another virtual router 22b may support a different set of physical interfaces. Based on the disclosure and teachings provided herein, a person of ordinary skill in the art will know of other ways and/or methods to configure a virtual router in accordance with the present invention.

Furthermore, having an IP stack in each virtual router 22 allows many applications that use the standard socket API to be run. The routing sockets use the standard socket API to update the FIB. Similarly, any application that require standard socket API can be run within the context of the virtual router process.

As the number of applications grows, the size of each virtual router process also increases thereby affecting performance. To overcome this performance issue, in one embodiment, the socket API is extended to support remote applications. This involves exporting the socket API to the remote application using an interprocess communication infrastructure. The applications then use the remote socket API as if they were directly connected to the socket layer sub-system. Each of the socket calls made by the remote applications is translated into remote procedure calls by the underlying socket library.

The remote socket library is flexible enough to support applications that are either internal or external. The library that is linked controls how the socket calls are to be handled. This implementation keeps in check the size of the virtual router and at the same time improves application performance. Apart from performance improvements, this design also offers flexibility to replace either virtual router software or the application software without affecting each other.

Under this implementation, the applications are made virtual router aware, meaning that an applications when using the socket API has to know the virtual router that it is communicating with.

In one exemplary aspect, as shown in FIG. 2, the application 24 is able to selectively communicate with the virtual routers 22 and the operating system kernel 34 to carry out its tasks. For example, the application 24 can communicate with the virtual router 22a via the corresponding socket layer 28 using the associated socket API. Optionally, the application 24 can also communicate with the operating system kernel 34 via a corresponding socket layer (not shown) using the associated socket API. Consequently, the application 24 can utilize combinations of virtual routers 22 and the operating system kernel 34 to complete its tasks. For example, if the application 24 is handling three (3) clients (not shown), the application 24 can use virtual routers 22a and 22b and the operating system kernel 34 to respectively execute tasks for the three (3) clients. It should be understood that there can be any number of virtual routers 22 implemented within the routing device 20, depending on system and/or design requirements and constraints. Based on the disclosure and teachings provided herein, a person of ordinary skill in the art will know of other ways and/or methods to use the virtual routers and the operating system kernel to accommodate one or more applications in accordance with the present invention.

In one implementation, the present invention is implemented using the Solaris® system manufactured by Sun Microsystems. The Solaris® system is an UNIX operating system. In this implementation, the virtual routers 22 are created in the user space. Furthermore, one UNIX process is used per virtual router 22. Since the UNIX operating system is a time-shared system, it schedules the virtual router processes appropriately thereby minimizing any scheduling problem.

In an exemplary implementation, the present invention is implemented using software in the form of control logic, in either an integrated or a modular manner. Alternatively, hardware or a combination of software and hardware can also be used to implement the present invention. Based on the disclosure and teachings provided herein, a person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A routing device comprising:
an operating system kernel;
a plurality of physical interfaces configured to receive packets to be forwarded;
a plurality of virtual routers, wherein the plurality of virtual routers comprise a plurality of instructions for controlling a data processor to perform one or more tasks, the instructions being stored on a computer readable medium, and wherein the plurality of virtual routers are external to the operating system kernel, wherein each virtual router further comprises:
a routing protocol stack configured to handle a plurality of routing protocols;
a plurality of interface drivers configured to communicate with at least a one of the plurality of physical interfaces;
an Internet Protocol (IP) stack configured to interact with the routing protocol stack and perform a forwarding function via the plurality of interface drivers, the IP stack having a forwarding information table, information from which is used to perform the forwarding function, wherein the routing protocol stack and the IP protocol stack are implemented using dynamic libraries shared among the plurality of virtual routers; and
a socket layer having a corresponding socket application programming interface, the socket layer configured to facilitate interactions between the IP stack and the routing protocol stack and the application, wherein the socket application programming interface is used to facilitate communications with the socket layer;
a router manager configured to manage the plurality of virtual routers, wherein the router manager is configured to couple each virtual router to at least one of the physical interfaces, wherein the router manager controls the coupling of the virtual routers to the physical interfaces, and wherein the coupling is performed on a dynamic basis; and
an application, wherein the application is situated external to the plurality of virtual routers, and wherein the application being configured to receive requests to perform a plurality of tasks for at least one client;
wherein the application is able to selectively communicate with one or more of the plurality of virtual routers and the operating system kernel on a dynamic basis to perform the plurality of tasks for the at least one client application, wherein the application selects a virtual router to perform a task based upon a set of routing protocols supported by the virtual router and the task to be performed;
wherein the IP stack of each of the plurality of virtual routers resides external to the operating system kernel;
wherein the operating system kernel further includes an associated socket layer, the socket layer having a corresponding socket application programming interface; and
wherein the application is able to communicate with the operating system kernel via the associated socket layer using the corresponding socket application programming interface to have the operating system kernel perform one or more of the plurality of tasks.

2. The routing device of claim 1 wherein software is used to implement the router manager.

3. An UNIX system incorporating the routing device as recited in claim 1.

4. The routing device of claim 1 wherein software is used to implement the plurality of virtual routers and the router manager.

5. A routing device comprising:
an operating system kernel;
a plurality of physical interfaces configured to receive packets to be forwarded;
a plurality of virtual routers, each virtual router having an associated socket layer and an Internet Protocol (IP) stack external to the operating system kernel, the associated socket layer having a corresponding socket application programming interface configured to facilitate communications with the associated socket layer, wherein each virtual router includes a routing protocol stack configured to communicate with corresponding physical interfaces, wherein the routing protocol stack and the IP protocol stack are implemented using dynamic libraries shared among the plurality of virtual routers, wherein the virtual routers further include:
a plurality of interface drivers configured to communicate with corresponding physical interfaces, wherein the Internet Protocol (IP) stack is configured to interact with the routing protocol stack and perform a forwarding function via the plurality of interface drivers, the IP stack having a forwarding information table, information from which is used to perform the forwarding function; and a socket layer having a corresponding socket application programming interface, the socket layer configured to facilitate interactions between the IP stack and the routing protocol stack and the application, wherein the socket application programming interface is used to facilitate communications with the socket layer;

an application residing external to the plurality of virtual routers; and a router manager configured to manage the plurality of virtual routers, wherein the router manager is configured to couple each virtual router to at least one of the physical interfaces, wherein the router manager controls the coupling of the virtual routers to the physical interfaces, and wherein the coupling is performed on a dynamic basis;

wherein the associated socket layer is configured to facilitate interactions between the IP stack and the application;

wherein the application is able to selectively interact with one of the plurality of virtual routers via the associated socket layer;

wherein the application is configured to receive requests to perform a plurality of tasks for at least one client application;

wherein the application uses the corresponding socket application programming interface to interact with the associated socket layer; and wherein the application is able to selectively interact with one or more of the plurality of virtual routers and the operating system kernel on a dynamic basis in order to have one or more of the plurality of virtual routers and the operating system kernel perform a plurality of tasks for the at least one client, wherein the application selects a virtual router to perform a task based upon a set of routing protocols supported by the virtual router and the task to be performed;

wherein the operating system kernel further includes an associated socket layer, the socket layer having a corresponding socket application programming interface; and wherein the application is able to communicate with the operating system kernel via the associated socket layer using the corresponding socket application programming interface to have the operating system kernel perform one or more of the plurality of tasks.

6. An UNIX system incorporating the routing device as recited in claim 5.

* * * * *

UNITED STATES PATENT AND TRADEMARK OFFICE
CERTIFICATE OF CORRECTION

PATENT NO.        : 7,617,327 B1
APPLICATION NO.  : 10/775732
DATED             : November 10, 2009
INVENTOR(S)       : Allam et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this

Nineteenth Day of October, 2010

David J. Kappos
*Director of the United States Patent and Trademark Office*